Patented Aug. 14, 1945

2,382,533

UNITED STATES PATENT OFFICE 2,382,533

OIL IN WATER DISPERSIONS

László Auer, South Orange, N. J.

No Drawing. Application December 14, 1942,
Serial No. 468,989

13 Claims. (Cl. 106—170)

GENERAL FIELD OF INVENTION AND STATEMENT OF OBJECTS

This invention relates to new fatty oil dispersion or emulsion products and to a method of producing the same. The invention is especially concerned with the production of stable emulsions of the oil-in-water type from heavy bodied fatty oils and from materials containing such oils.

Although the term "emulsion" is sometimes applied only to that class of colloidal dispersions wherein both the dispersed phase and dispersion medium are liquid, in technical literature the term "emulsion" is quite commonly applied to that type of dispersion in which the dispersed phase is a solid material, so long as the dispersion displays the general nature and behavior of liquid-liquid emulsions. Thus, for instance, rubber latex is commonly referred to as an emulsion, in spite of the fact that the rubber particles in the latex are solid. It is to be understood that herein the term emulsion is not employed in the narrow sense, but is used to apply to both types of dispersion.

Emulsions of the character above mentioned have a number of applications in the field of coating compositions and I have found that emulsions produced in accordance with the present invention have exceptionally good properties for various coating compositions, as will further appear.

According to the invention, the dispersions of the heavy bodied fatty oils contain both methyl cellulose and another agent (wetting agent) for reducing the surface tension at the oil-water interface. Dispersions of this type have excellent stability and are easy to prepare and disperse, in the presence of the methyl cellulose in combination with a wetting agent known to reduce the surface tension at the oil-water interface.

Heretofore it has been difficult to disperse many of the heavy bodied fatty oils and has, in addition, been difficult to secure a dispersion of many of such heavy bodied oils, which is stable for any reasonable length of time.

I have found, however, that highly satisfactory results are secured, both from the standpoint of preparation of the dispersion and also from the standpoint of the properties thereof, where the dispersion contains the two ingredients or agents mentioned above, and where the dispersed phase of the emulsion consists of or incorporates a heavy bodied fatty oil having a viscosity at least as high as Q on the Gardner scale and preferably higher than V, for instance from Z—1 to Z—6.

The dispersions according to the present invention are not only relatively easily formed, but also are easily dilutable with water, have good stability, and many of them may further have quite low viscosity for a given degree of dilution.

Because of the foregoing and other advantageous properties of the dispersions according to this invention, such new dispersions are capable of effective use in many coating compositions where cutting or diluting of the composition with water is of advantage, for instance, in coatings to be applied to porous surfaces, made of paper, stucco, wood, plaster, cement, etc., such as walls and/or floors.

Various of the distinctive and advantageous properties of the dispersions of the present invention are considered more fully hereinafter, but it is here further mentioned that employment of dispersions containing methyl cellulose is of advantage for many uses because of the fact that methyl cellulose is only very difficultly soluble in cold water and insoluble in boiling water. In general, emulsifying agents and protective colloids heretofore employed are very readily water soluble and do not lose this characteristic when coating compositions containing them are undergoing the film-forming (drying) process. The presence of such readily water soluble agents reduces the water and weather resistance of the films. Therefore, when methyl cellulose is used, for instance, in emulsions of varnishes, impregnating compositions or in other materials where weather resistance is of importance, films may be deposited, which films have a high degree of water resistance. Still other advantageous properties of the emulsions are mentioned hereinafter.

STARTING MATERIAL

The invention is applicable to the dispersion of heavy bodied fatty oils generally, the following being a typical list of such fatty oils:

Tung oil
Oiticica oil
Dehydrated castor oil
Linseed oil
Perilla oil
Sunflower oil
Poppyseed oil
Soya bean oil
Walnut oil
Rapeseed oil
Pine seed oil
Olive oil
Corn oil
Cottonseed oil
Coconut oil
Babassu oil
Hydroxylated oils such as castor oil, etc.
Fish oils (train oils)

In addition, it should be noted that esters of fatty acids other than the natural glycerin esters (fatty oils) may be used, for example, synthetic glycerin esters of fatty acids, and fatty acid esters formed with other polyhydric alcohols, such as glycols, pentaerythritol, mannitol, sorbitol, etc.

Alkyd resins of the types containing fatty acids and polyhydric alcohols may also be dispersed according to the present invention.

Still further, other combinations of materials may be used as the starting material. Thus, in addition to dispersion of heavy bodied fatty oils themselves, the invention contemplates dispersion of mixtures of such oils with resins, such as rosin or other resins used in making oleo-resinous varnishes. Other useful composite materials are heavy bodied fatty oils with solvents; and such heavy bodied fatty oils mixed both with resins and with solvents.

The fatty oil need not necessarily be bodied by itself prior to dispersion but may be bodied in admixture with other materials, as in the cooking or bodying of oleo-resinous varnish bases. Thus, the invention is also applicable to the preparation of dispersions of varnish bases containing fatty oils where the varnish base has a heavy body, for instance above about Q on the Gardner scale.

Varnish base dispersions of the above types yield new and useful dispersion products of particular utility in the field of coating or impregnating compositions. Herein the term varnish base is used to refer to the varnish solids, usually fatty oils or fatty oil and resin mixtures, and sometimes also suitable resins alone.

The bodying of a fatty oil may be effected in any one of quite a wide variety of ways, as follows: For instance, mere heating of the fatty oil at heat bodying temperatures may in some cases be sufficient to raise the viscosity to a sufficient degree (above Q on the Gardner scale). In many cases heating in the presence of modifying agents promoting heat bodying is frequently an advantageous way of securing the heat bodied oil, many examples of such heat bodying in the presence of modifying agents being disclosed in Patents Nos. 1,963,065, 2,189,772, 2,213,944, 2,293,038, 2,298,270, and 2,298,916.

Certain of the treatments in the presence of modifying agents, for instance, use of alkali metal hydroxides as disclosed in Patent No. 1,963,065 may be relied upon to produce a water soluble soap by reaction with fatty acids present in the oil. Such a soap may serve the function of a wetting agent, so that after the bodying addition of methyl cellulose may be sufficient in producing the dispersion.

Again, air or oxygen blowing, either with or without increase in temperature may be employed for bodying. Blowing of other gases through the oil either at low or at elevated temperatures may also serve the purpose.

There are still other ways in which bodying may be achieved, for instance, by subjecting the oil to the action of ultra-violet light, producing so-called "Uviol" oils. Furthermore, subjecting the oil to electrical potential differences, or to electric fields are expedients known to secure heavy bodying, an example of such an oil being known as "Voltol" oil.

Bodying of varnish bases, for example, oleoresinous bases may also be accomplished in various ways, through most commonly by heating, frequently termed "cooking."

DISPERSION PROCEDURE

In considering the dispersion procedure, it is first noted that dispersion may be effected with any of several different known types of equipment, and also in accordance with several different general modes or methods of dispersion, the important consideration from the standpoint of this invention being the presence of methyl cellulose in the dispersion produced and also of a wetting agent the latter being of a type known to reduce the surface tension of the oil-water interface. Said agent may be a soap or a sulphonated fatty alcohol or other wetting agent, as is disclosed more fully herebelow.

As to equipment and methods in general, with certain materials, especially those which are liquid at room temperature, mere mixing and agitation of the materials may suffice. Mixing of the materials on a roller mill of the types employed in grinding pigments into paints may also be adopted, this practice being quite effective for certain materials, especially materials which are solid or semi-solid at normal room temperatures.

When a three-roller paint mill is employed for dispersion, it will be found advantageous to set the first two rollers quite close together, the third or takeoff roller being separated from the middle roller. The material to be dispersed is placed on the first two rollers and worked until uniform. During this initial working, it is frequently of advantage to maintain a temperature differential between the first and second rollers (customarily accomplished by circulating a cooling liquid through the second roller), the result of which is that the material remains primarily on the second or middle roller, with little or none on the first roller. The liquids or solutions added at the time of dispersion are preferably added slowly or in increments, and after all additions are made, the takeoff roller may be adjusted so as to pick the material up from the middle roller, the material finally being removed from the take-off roller by the usual doctor blade, and collected in any suitable receptacle.

Again mixture and dispersion may be effected by placing the materials in a kneading machine of the Werner and Pfleiderer type. Other machines of this general type are the so-called Banbury and Baker-Perkins mixers. The Werner and Pfleiderer mixer is particularly effective in handling relatively heavy materials and secures thorough dispersion in many instances where such dispersion is otherwise very difficult to attain.

Other conventional equipment may also be used such as homogenizers, and various types of colloid mills.

Not all types of equipment are necessarily useable with all the dispersions which can be made according to this invention, so that selection may be required according to the particular problem.

In employing any of the foregoing means of securing dispersion, at least some heat may be advantageously applied, especially in cases where the product to be dispersed is stiff or solid at room temperature. If heating is required with stiff materials, the dispersion is conveniently effected in a Werner and Pfleiderer mixer, which is equipped to be heated by an external jacket and/or through the kneading blades. In cases where simple agitation is sufficient, the vessel may be heated in any suitable manner.

METHYL CELLULOSE

Methyl cellulose is a cellulose ether which is difficultly soluble in cold water, and insoluble in boiling water. It is commercially available in various viscosity ranges. Preferably, according to the present invention, it is used in a form having relatively low viscosity, since aqueous solutions of the low viscosity methyl cellulose are easier to prepare than the solutions of high viscosity methyl cellulose. A suitable range of methyl cellulose viscosity extends from about 15 centipoises to about 25 centipoises (cps.) in 2% aqueous solution. However, for specific purposes it may be advantageous to use methyl cellulose having a higher viscosity than 25 centipoises.

I have found methyl cellulose to be a highly desirable ingredient in heavy bodied fatty oil dispersions, particularly when the viscosity of the oil is above Q on the Gardner scale. In addition to the advantage of ease of dispersion and emulsion stability, which advantages are attributable at least in part to the employment of methyl cellulose, the presence of methyl cellulose does not detrimentally influence other properties of the emulsion or of the coating films or other materials made therefrom. In fact, various advantageous properties of, for instance, coating films made from the emulsions, are even enhanced by the presence of methyl cellulose.

To illustrate the above, the very fact that methyl cellulose is only difficultly soluble in cold water and insoluble in hot water, is of distinct advantage, for instance, in coating compositions, impregnating compositions or in other materials wherein water and weather resistance are of importance, as explained above.

Moreover, methyl cellulose is neutral and therefore does not alter the pH value of the emulsions or dispersions. The importance of this will be apparent if it be kept in mind that the particles of the dispersed phase of a dispersion frequently manifest a tendency to adsorb emulsifying or stabilizing agents present; and that such adsorption of agents capable of changing the pH value, not infrequently reaches the critical stage at which undesired and premature precipitation occurs. Since methyl cellulose is neutral, adsorption thereof into the particles of the dispersed phase will not have a tendency to approach the critical stage just mentioned, and therefore emulsions containing methyl cellulose are more "storage resistant" than are many other dispersions.

Because of the neutrality of methyl cellulose, dispersions containing methyl cellulose have especially advantageous characteristics from the standpoint of mixing with other dispersions containing either anionic or cationic emulsifying agents. The admixture of methyl cellulose containing emulsions with such other emulsions will not tend to precipitate or demulsify either component of the mixture, which is in contrast with the result sometimes following from mixing one emulsion containing an anionic emulsifying agent with another emulsion containing a cationic emulsifying agent.

I have found, moreover, that methyl cellulose has the capability of forming an "envelope" around the particles of the dispersed phase, thereby safeguarding the stability of the emulsion. Such an envelope is sometimes referred to as a layer of solvation.

As above noted, many of the characteristics of methyl cellulose are of peculiar importance and advantage in the field of aqueous dispersions of coating compositions, or with other materials in which water resistance of the films or other deposits formed is of advantage.

The methyl cellulose may be dispersed in the materials being emulsified in different ways, depending somewhat on the nature of the materials being emulsified. However, in general, I prefer to introduce the methyl cellulose in the form of an aqueous solution, small portions of which are successively added, the latter procedure being of especial importance when emulsifying relatively solid materials.

The concentration of the methyl cellulose in the solution employed for introducing it into the mixture may vary over a considerable percentage range, although I have found effective results are secured with a solution in which the methyl cellulose constitutes from about 1% to about 5%. Highly effective results have been obtained by the employment of a solution of about 2% concentration.

The total quantity of methyl cellulose need not be more than a very small percentage, even down to about 0.1% (based on the solid content of the dispersion) being effective in many cases. Naturally, the methyl cellulose need only be used in that quantity required to serve its intended functions, any excess usually being uneconomical from the standpoint of use of materials. From a very small fraction of 1%, for instance, from about 0.01% or 0.05% up to about 2% (based on the solid content) is sufficient for most purposes.

With regard to the quantity of methyl cellulose present, it is noted that in general, the percentage (based on the content of dispersed phase) should be increased in accordance with the quantity of water present.

WETTING AGENT

As above indicated, the dispersion should also contain a wetting agent. Most of such wetting agents are soaps, or sulphonated organic compounds or their salts, such as fatty alcohol sulphonates or their salts (fatty alcohol sulphates), amongst others. Specific examples of useful wetting agents other than soaps are as follows:

| Trade name and source | Manufacturer's description |
| --- | --- |
| Duponol ME—E. I. duPont de Nemours & Company. | Fatty alcohol sulphate. |
| Aerosol OT—American Cyanamid Co. | Dioctyl ester of sodium sulphosuccinic acid. |
| Emulphor AG—General Dyestuff Corp. | Polyethyleneoxide condensation product. |
| Nekal—General Dyestuff Corp. | Sodium salt of alkyl-substituted naphthalene sulphonate. |
| Igepon—General Dyestuff Corp. | Sodium sulphonate of an oleic acid ester of an aliphatic compound, for instance, of the type of $C_{17}H_{31}CON-CH_3C_2H_4SO_3Na$. |
| Triton 720—Rohm & Haas | Sodium salt of aryl-alkyl polyether sulphonate. |
| Emulgor A—Glyco Products | A highly-polymerized glycol ester. |
| Wetanol—Glyco Products | Modified sodium salts of sulphated fatty alcohols. |
| Darvan—R. T. Vanderbilt Co. | Polymerized sodium salts of alkyl naphthalene sulphonic acids. |
| Hornkem—Hornkem Corp. | Purified sulpholignin. |

The foregoing list is merely illustrative. It should be noted that wetting agents (or, more commonly, "surface-active" agents) in general seem to be effective, the capacity to reduce surface tension at the oil-water interface being the criterion.

Still further, I have found that soaps constitute a highly effective group of materials to be employed as wetting agents, for instance, ammonium soaps, amine soaps, and alkali metal soaps. Such soaps may be produced in situ during emulsification by adding a solution of a base, to the mixture, which may form a soap with free fatty acids present in the oil or with free resin acids present in the resin portion of the varnish base, if such is used. Examples of such bases are: alkali hydroxides, such as sodium hydroxide, aqueous solutions of ammonia and of organic amines, for instance: triethanolamine, morpholine, etc.

The addition of sodium hydroxide or of other aqueous solutions of soap forming bases, so as to form a soap in situ, is highly advantageous in the dispersion produced, since this may be relied upon to neutralize at least a part of the fatty acid present and thereby aid in avoiding a drop in pH value of the dispersion upon storage, to a point close to or beyond that critical point where premature precipitation will occur.

By addition of sodium hydroxide or other similar soap forming compound, a wetting agent is formed in situ, thereby further enhancing the stability and storage-resistance of the dispersion being produced.

Beyond the foregoing, I have found that the mobility of the dispersion (with a given quantity of water present) is lower (higher viscosity) where the dispersed phase shows an appreciable acid number. The closer the dispersed phase is brought to neutrality, the more fluid or less viscous will be the dispersion obtained. Therefore, for many purposes it is advantageous to form the soap in situ by adding approximately that quantity of soap forming compound which will bring the acid number of the dispersed phase close to the point of neutrality. Addition of excess alkali apparently does not further reduce the viscosity, although for at least some purposes excess alkali should be avoided because under extreme conditions it may saponify a part of the neutral fatty acid esters.

If desired, soaps may be added directly instead of being formed in situ, or in both ways.

The wetting agent may be introduced into the material being dispersed in various different ways and in different stages of the dispersion process. In some cases, as stated above, I prefer to introduce the wetting agent or the compound capable of forming the wetting agent in situ by adding such agents or compounds in aqueous solution.

EFFECT OF JOINT OR SEQUENTIAL ADDITION OF METHYL CELLULOSE AND WETTING AGENT

In general, it may be stated that the methyl cellulose and wetting agent may be introduced into the materials being dispersed either jointly or in sequence. However, for certain purposes, with certain materials, and when employing different types of dispersion equipment, there are advantages in selecting certain particular ways of adding the methyl cellulose and the wetting agent.

By way of example, consider dispersion of a fatty oil heat bodied to a substantially solid consistency in the presence of both methyl cellulose and sodium hydroxide (to form a soap in situ). When forming such a dispersion on a paint mill of the three roller type, as above described, it will be found advantageous to add the methyl cellulose solution prior to addition of the sodium hydroxide solution. On the other hand, where a dispersion of this type is being made on a kneading machine, for instance, of the Werner and Pfleiderer type, it will be found advantageous to first add the sodium hydroxide solution, and thereafter the methyl cellulose solution.

The addition of sodium hydroxide and various other soap forming compounds or the soaps themselves prior to addition of the methyl cellulose has a tendency to make a substantially solid heat bodied oil dry or doughy which is a disadvantage when working on the paint mill, but is an advantage when working in a kneading machine. Thorough admixture and dispersion is not readily secured on a paint mill if the mixture has a flaky or doughy consistency, although that very consistency is well adapted to thorough mixing and dispersion in a machine of the kneading type.

The methyl cellulose and wetting agent may, if desired, be preliminarily placed in a common solution and added jointly in that form. Where the fatty oil is of relatively low viscosity, simple agitation may be adopted in order to mix in the methyl cellulose solution and the wetting agent (or compounds for forming the wetting agents in situ).

The Gardner scale, referred to in the following examples, is one according to which the viscosity of an oil is determined by comparing the rate at which a bubble rises through a column of oil of a given diameter and height with the rate at which a bubble rises through a column of liquid of the same diameter and height and of a standard viscosity, in a sealed tube. The theory and apparatus involved are discussed in "Physical and Chemical Examination of Paints, Varnishes, Lacquers and Colors," by Henry A. Gardner, at page 217 of the 9th edition (1939) published by the Institute of Paint and Varnish Research, 1500 Rhode Island Avenue, N. W., Washington, D. C.

EXAMPLES

*Example No. 1*

A bodied oil was prepared as follows:

A batch of 8000 grams of raw linseed oil was heated under vacuum at a pressure of 100 mm. Hg in a 22-liter flask, and during rise in temperature to 300° C. $SO_2$ was bubbled through the oil at a rate of 20 grams per hour. The oil was kept for five hours at 300° C., during all of which time the bubbling of $SO_2$ was continued and then the heating was stopped and the mass was allowed to cool to 200° C., $SO_2$ still being bubbled therethrough during drop in temperature. When 200° C. was reached, the mass was permitted to cool to room temperature. The oil prepared in this manner is hereinafter referred to as "$SO_2$ oil."

The oil product produced in accordance with the foregoing is quite heavily bodied, having a viscosity of about Z-6 on the Gardner scale.

100 grams of $SO_2$ oil were heated slightly above room temperature (about 40° C.) so as to increase its mobility. 0.5 grams of Duponol ME were dissolved in 10 cc. of water and this solution was added to the bodied oil under agitation. After incorporating the wetting agent, 50 cc. of a 2% aqueous methyl cellulose solution were added, followed by a further addition of 40 cc. of water. These additions were also made under agitation. The methyl cellulose employed was of low viscosity, i. e. 25 cps.

The resulting emulsion was readily dilutable with water and quite stable.

*Example No. 2*

A batch of 100 grams of the $SO_2$ oil prepared as specified above was heated to 100° C. and then 50 grams of ester gum were added. The temperature of the mixture was then raised to 300° C. and held at that temperature for 30 minutes, to form a varnish base. After cooling to 60° C.

15 cc. of water containing 0.75 grams of Duponol ME were added under agitation. Thereafter, 75 cc. of a 2% aqueous methyl cellulose (25 cps.) solution were added, and finally 60 cc. of water, all additions being made under agitation.

The emulsion was of the oil-in-water type and was readily dilutable with water.

*Example No. 3*

A batch of linseed oil heat bodied to a viscosity of Z–6 on the Gardner scale was used to prepare a maleic type varnish of 12½ gallon length. Amberol 801 (a rosin modified maleic resin) was employed, the varnish being cooked at 300° C., until when diluted with mineral spirits to 50% solids content, the viscosity of the solution was H on the Gardner scale. The holding period necessary in obtaining this viscosity was about 35 minutes.

100 grams of the foregoing varnish were agitated while adding a mixture of 3 grams of 35% aqueous Aerosol #26 (American Cyanamid Co.), 51 cc. of a 2% aqueous methyl cellulose solution and 48 cc. of water. The dispersion produced was of the oil-in-water type and was readily dilutable with water.

*Example No. 4*

A maleic type varnish was prepared in the same manner as described above under Example 3, except that the varnish was of 25 gallon length instead of 12½ gallon length. The holding time at 300° C. was about 50 minutes, yielding after thinning a viscosity of I on the Gardner scale. 100 grams of this varnish were agitated, while adding a mixture of 1 gram of Aerosol #04–22 (American Cyanamid Co.), 51 cc. of a 2% aqueous methyl cellulose solution, and 50 cc. of water.

The dispersion produced was of the oil-in-water type and was readily dilutable with water.

*Example No. 5*

A maleic type varnish base of 50 gallon length was prepared, using alkali-refined linseed oil of viscosity about A— on the Gardner scale. This varnish base was prepared with the same type maleic resin referred to under Examples 3 and 4 and was cooked to a viscosity of about W on the Gardner scale.

100 grams of the varnish base just described were agitated, while adding 1 gram of Emulphor AG (General Dyestuff Corp.). Thereafter 51 cc. of a 2% aqueous methyl cellulose solution and 50 cc. of water were added, with agitation. This produced an oil-in-water emulsion which was readily dilutable with water.

*Example No. 6*

The same type varnish base was employed in Example 6 as in Example 5.

In forming the dispersion 50 grams of the varnish base were agitated, while adding a mixture of 0.5 grams Aerosol #04–22, 25 cc. of a 2% aqueous methyl cellulose solution and 25 cc. of water. The dispersion was of the oil-in-water type and diluted readily with water. It was somewhat more stable than the dispersion of Example 5.

I claim:

1. A coating composition comprising a dispersion of the oil-in-water type, the dispersion medium comprising water and the dispersed phase comprising film forming vehicle solids incorporating a fatty oil, the vehicle solids of said dispersed phase having a viscosity of at least Q on the Gardner scale, and the dispersion containing methyl cellulose and another surface-active agent which reduces the surface tension of the oil-water interface, the quantity of the methyl cellulose being from about 0.1% to about 2% of the weight of said vehicle solids.

2. A coating composition in accordance with claim 1 in which the vehicle solids incorporate a fatty oil having a viscosity of at least Q on the Gardner scale.

3. A coating composition in accordance with claim 1 in which the vehicle solids comprise a varnish base blend having a viscosity of at least Q on the Gardner scale.

4. A coating composition in accordance with claim 1 in which said vehicle solids also incorporate a resin.

5. A coating composition in accordance with claim 1 in which the dispersed phase also incorporates an organic solvent for the vehicle solids.

6. A coating composition in accordance with claim 1 in which the methyl cellulose is present in an amount from about 0.01% to about 2% of the dispersed phase.

7. A coating composition in accordance with claim 1 in which the methyl cellulose is present in an amount about 1% of the dispersed phase.

8. A coating composition in accordance with claim 1 in which said methyl cellulose is of a viscosity in a range from about 15 cps. to about 25 cps.

9. A coating composition in accordance with claim 1 in which said other agent for reducing the surface tension of the oil-water interface is selected from the class consisting of water soluble soaps and salts of sulphonated fatty alcohols (fatty alcohol sulphates).

10. A coating composition in accordance with claim 1 in which said other agent for reducing the surface tension of the oil-water interface is an alkali metal soap of a fatty acid.

11. A coating composition in accordance with claim 1 in which said other agent for reducing the surface tension of the oil-water interface is a sodium soap of a fatty acid.

12. An oil-in-water dispersion of a bodied fatty oil, containing methyl cellulose and another surface-active agent which reduces the surface tension of the oil-water interface, said bodied fatty oil having a viscosity higher than Q on the Gardner scale, and the quantity of the methyl cellulose being from about 0.1% to about 2% of the weight of the bodied fatty oil.

13. An oil-in-water dispersion of a bodied fatty oil having a viscosity higher than V on the Gardner scale, the dispersion containing methyl cellulose and another surface-active agent which reduces the surface tension of the oil-water interface, the quantity of the methyl cellulose being from about 0.1% to about 2% of the weight of the bodied fatty oil.

LÁSZLÓ AUER.